T. Shailer,
Burrow Trap,
No. 3,580. Patented May 10, 1844.
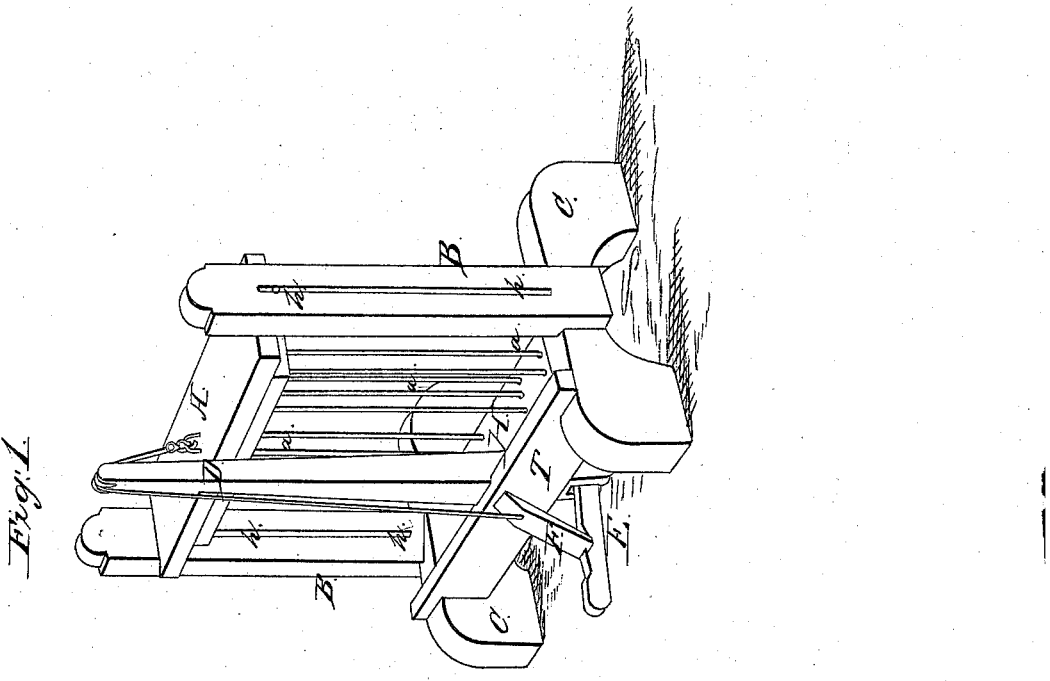
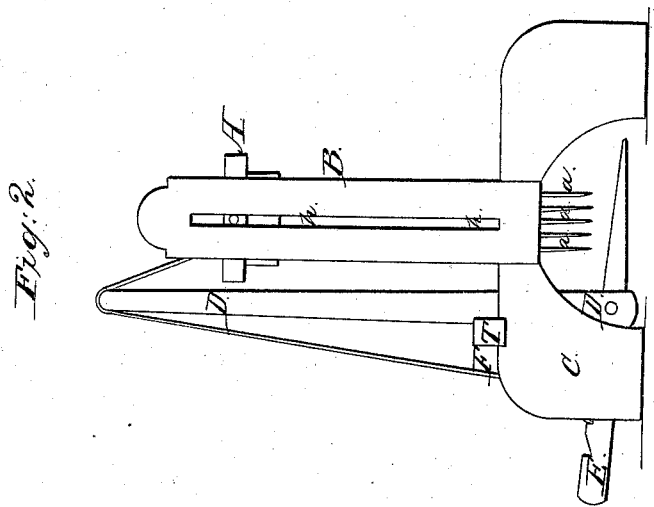

UNITED STATES PATENT OFFICE.

THOMAS SHAILER, OF HADDAM, CONNECTICUT.

TRAP FOR CATCHING ANIMALS.

Specification of Letters Patent No. 3,580, dated May 10, 1844.

*To all whom it may concern:*

Be it known that I, THOMAS SHAILER, of Haddam, in the county of Middlesex and State of Connecticut, have invented a new and useful Trap for Catching Moles; and I do hereby declare that the following is a full and exact description.

The destruction of vegetables and loss of crops by moles, is known and felt by nearly all cultivators of old lands; hence the utility of a trap that will successfully catch those animals. The earth being their element, they are continually forming new paths which are about three inches below the surface of the earth, in the formation of which they raise a portion of the earth, which enables us to discover the location and direction of their paths. Now if any portion of their path becomes pressed in, they will again restore it to its former perfection, by again raising the earth from the disturbed part. From a knowledge of the last named fact it has occurred to me that a trap might be sprung by the motion of the earth, when raised, as above stated, and that pointed wires might be forced down into the earth upon them which would secure them until taken away. Now the nature of my invention consists in combining those two principles, into the form of a trap and I will now proceed to describe its construction and operation.

In the accompanying drawing, Figure 1, is a perspective, and Fig. 2, an end view of my trap.

A represents a sliding board, made to slide up and down by means of pins one in each end, which enter the slots *h, h,* in the two posts B, B, which are designed for that purpose and are made stationary to the two end pieces C, C. From the lower surface of the sliding board A project a number of wires *a, a, a* which are there made permanent by entering holes made for that purpose and by being riveted therein. These wires are about eight inches long, with their lower ends pointed, which pass through holes, bored through the bottom piece H, the ends of which are made stationary to the two end pieces, C, C, and it serves also to keep those pieces at a proper distance apart, and in that manner forms a part of the frame work. The holes through the board H, are made large enough to allow the wires to slide in them freely as occasion may require. E represents a lever which extends through the upright D, at its lower extremity and is there suspended by a pin which admits of its working in the form of a lever, the pin forming the fulcrum. The upright D is fastened to the cross piece T which is extended across from one end piece to the other, for the purpose of supporting the upright, D and for inserting one end of the fly lever F, the other end of which enters a notch made near the outer end of the lever E. The flying lever F is connected to the sliding board A by a string or wire which extends around the top of the upright D, and thus, in connection with the two levers, form the setting part of the trap. The two end pieces C, C, are hollowed up from their lower edges, so that they may be placed upon the path without disturbing it, and that the mole may pass under them, without raising the frame work of the trap.

To set the trap—in the first place press down a small place of the path, then place the two end pieces C, C, astride the path, and bring that end of the lever F which extends under the trap to touch that part of the path which has been pressed down. With the fly lever and string in the position described, place two brick, (or their equivalent in weight) upon the sliding board A.

Its operation is when the mole raises the earth from its path which has been pressed down, it also raises that end of the lever E which extends under the trap, and of course lowers the outer end from the fly lever F, which liberates the sliding board A (and its wires); the weight thereon forces the wires down into the earth upon the mole, one half of the wires passing down on either side of the lever E, which renders the trap sure though the mole come from either direction.

The dimensions of the trap may be double that of the accompanying drawings.

What I claim as my invention and desire to secure by Letters Patent, is—

In the manner in which I have combined the lever E, one end of which is to rest on the ground, with the sliding board A, and the pointed wires 1, 2, 3, &c., with each other, and with the other parts of the trap, so that the raising of the ground by the mole shall cause the wires to descend, the respective parts being arranged substantially as herein described.

THOMAS SHAILER.

Witnesses:
　D. B. WARNER,
　ELIPHALET A. BULKELEY.